United States Patent [19]

McKinnon

[11] 4,163,503
[45] Aug. 7, 1979

[54] LID AND HOUSING

[75] Inventor: Robert M. McKinnon, Bedford, Tex.

[73] Assignee: D/FW Plastics, Inc., Bedford, Tex.

[21] Appl. No.: 944,074

[22] Filed: Sep. 20, 1978

[51] Int. Cl.² ............................................ B65D 25/24
[52] U.S. Cl. ...................................... 220/18; 220/3.8;
220/257; 220/307; 220/287; 137/371
[58] Field of Search ................... 220/18, 3.8, 254, 306,
220/307, 287; 137/363, 364, 371; 73/273;
49/35; 52/20, 21

[56] References Cited

U.S. PATENT DOCUMENTS

| 3,263,853 | 8/1966 | Smith ...................................... 220/18 |
| 3,390,806 | 7/1968 | Herbert ................................. 220/307 |
| 3,858,755 | 1/1975 | Telben .............................. 137/371 X |
| 3,921,449 | 11/1975 | Hauffe et al. ..................... 137/371 X |
| 3,952,908 | 4/1976 | Carson .................................... 220/18 |

*Primary Examiner*—George T. Hall
*Attorney, Agent, or Firm*—Wofford, Fails & Zobal

[57] ABSTRACT

A rectangular shape lid for closing a rectangular shaped top opening of a water meter housing. The lid is formed of plastic material and has a seating surface on its lower side for engaging the upper edge of the housing for support purposes. This feature allows the lid to fit housings having different size openings. Lower supporting ridges are formed on the lower side of the lid in such a manner that they allow the lid to fit housings having different radius of curvature at the corners. Hooks are provided on opposite ends of the lid for securing the lid to the housing.

Also provided is a housing formed of plastic material. The housing has an upper edge formed by inner and outer ridges which define the top opening. The inner and outer ridges are joined together at a position below the upper edge and extend away from each other in an upward direction. Connecting ribs extend between the inner and outer ridges to form a strong upper edge for supporting a lid.

6 Claims, 6 Drawing Figures

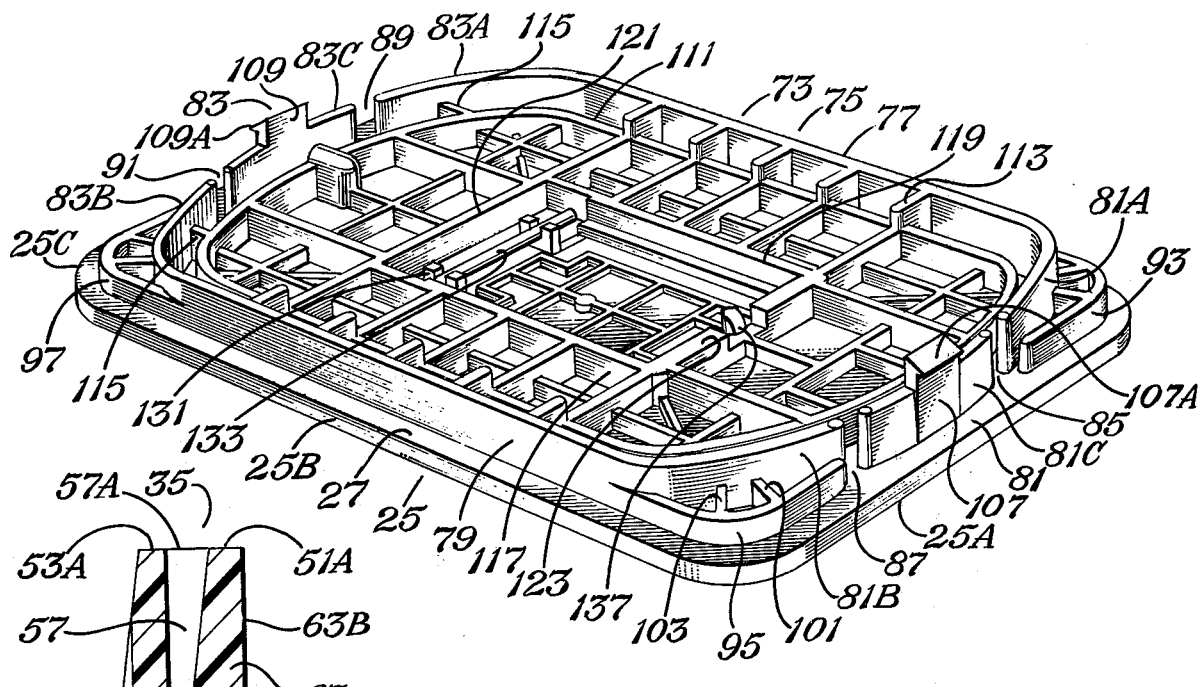
Fig. 3
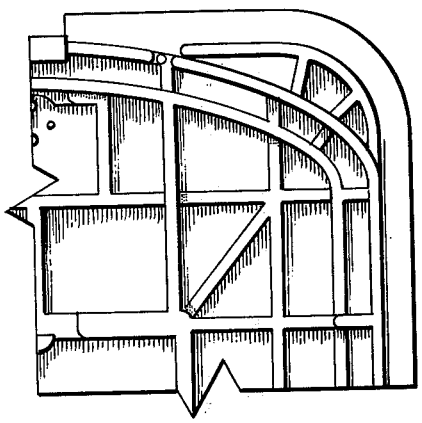
Fig. 4
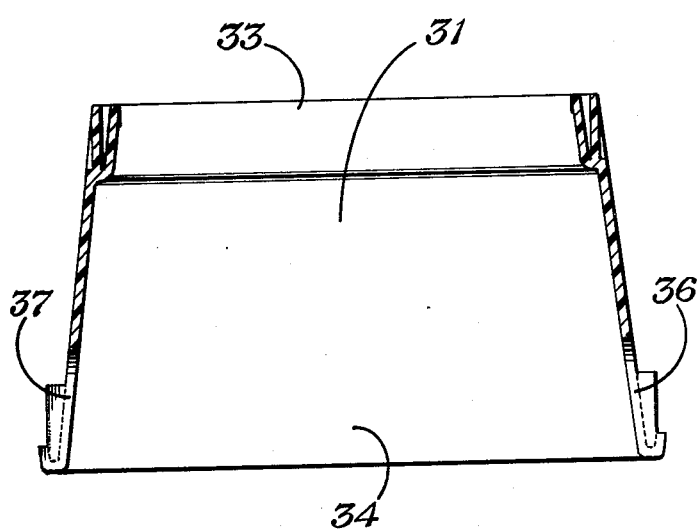
Fig. 6
Fig. 5

LID AND HOUSING

BACKGROUND OF THE INVENTION

This invention relates to a lid and housing for use for providing protection for below ground devices such as water meters, valves, etc.

SUMMARY OF THE INVENTION

It is an object of the present invention to provide a rectangular shape lid of plastic material to fit rectangular shaped upper openings of housings which are of different sizes and have different radius of curvature at the corners. The lid has a seating surface on its lower side for engaging the upper edge of the housing for support purposes. This feature allows the lid to fit housings having different size top openings. Lower supporting ridges are formed on the lower side of the lid in a manner to allow the lid to fit housings having different radius of curvature at the corners. Hooks are provided on opposite ends of the lid for securing the lid to the housing.

It is a further object of the present invention to form a housing of plastic material and which has a lid supporting top edge which defines the upper opening. The upper wall structure forming the top edge comprises inner and outer ridges joined together at a position below the top edge and which extend away from each other in an upward direction. Connecting ribs extend between the inner and outer ridges to form a strong top edge for supporting a lid.

A BRIEF DESCRIPTION OF THE DRAWINGS

FIG. 3 is a perspective view of the bottom side of the lid of FIG. 2.

FIG. 4 is a plan view of the lower right portion of the lid of FIG. 3.

FIG. 5 is a cross sectional view of the housing of FIG. 1.

FIG. 6 is a cross sectional view of FIG. 1 taken through lines 6—6 thereof.

DETAILED DESCRIPTION OF THE PREFERRED EMBODIMENTS

Figures 1, 2:
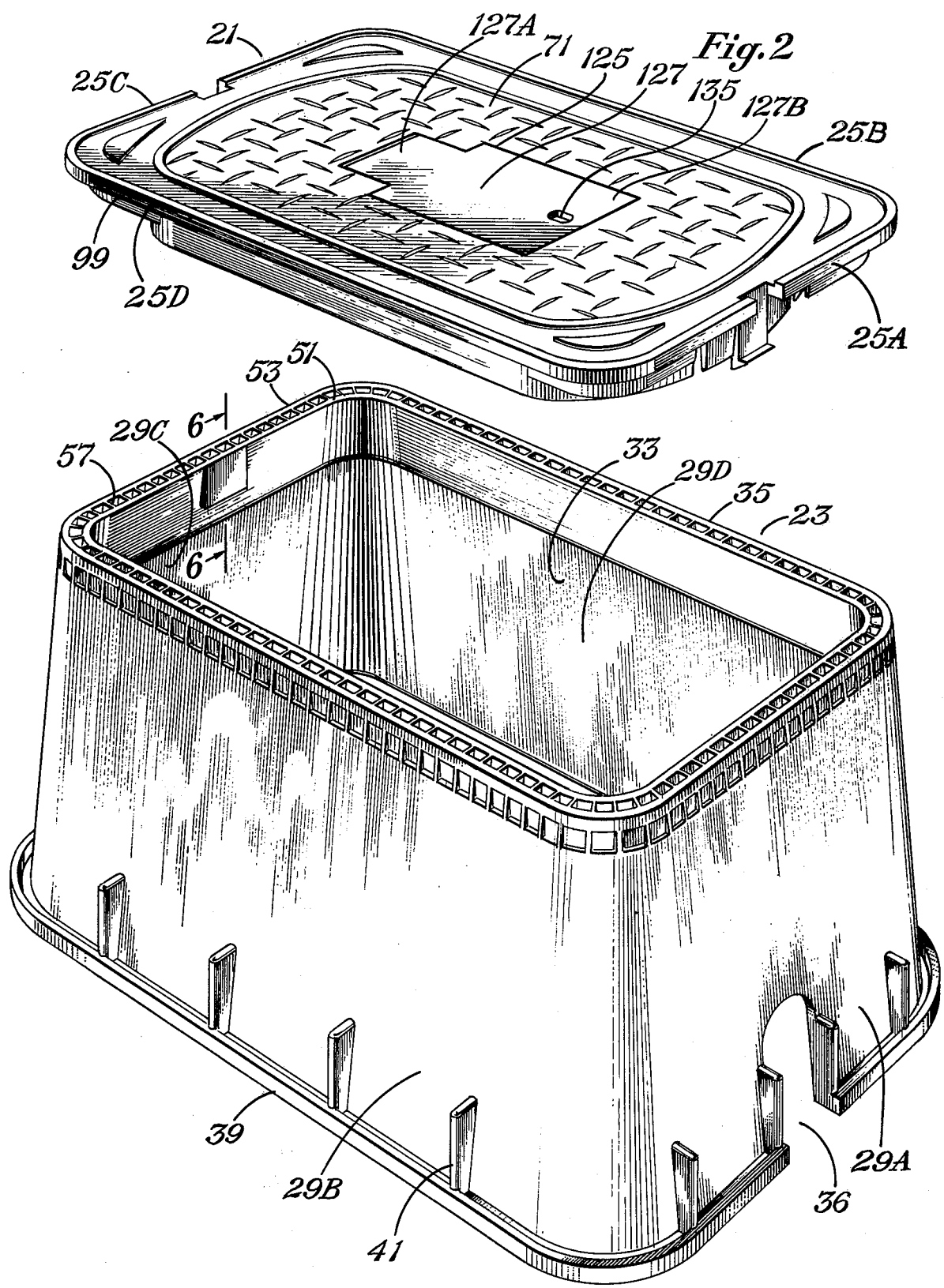
FIG. 1 is a perspective view of the housing of the present invention.
FIG. 2 is a perspective view of the top side of the lid of the present invention.

Referring now to FIGS. 1 and 2 of the drawings, the lid and housing of the present invention are identified at 21 and 23 respectively. Both the lid 21 and housing 23 are formed of plastic material which preferably is polyproplyene or polyethylene. These plastic materials are preferred since they provide rigidity, high strength, and high impact resistance. In addition, they may be injection molded to form the lid and housing.

The lid 21 comprises a planer lid member 25 rectangular in shape having supporting ridges integral with lid member 25 and formed on the bottom side thereof. A rectangular shaped outer seating surface 27 is formed on the bottom side of the lid member 25.

The housing has the shape of a truncated pyramid having four sides defined by walls 29A–29D which form a cavity 31 having a top opening 33 and a bottom opening 34. Openings 33 and 34 both are rectangular in shape. The walls of the housing have an upper edge 35 adapted to support the rectangular shape seating surface 27 formed on the bottom side of the lid to allow the lid to close the top opening 33.

In use, the housing 23 is employed to protect devices located below the level of the ground such as water meters, valves, etc. Normally, the top of the lid 21 when in its closed position is at ground level. The walls 29A and 29C of the housing have lower openings 36 and 37 formed therethrough to provide access for piping to the device to be protected by the housing such as a water meter. The lower edges of walls 29A–29D are formed in a channel 39 for support purposes. Lower vertical ribs 41 also are provided for support purposes.

The upper portions of the walls 29A–29D are formed by an inner ridge 51 and an outer ridge 53 which are joined together at a position 55 located below the upper edge 35 and which extend away from each other in an upward direction. Spaced apart connecting ribs 57 extend between ridges 51 and 53 from point 59 (FIG. 6) upward to their upper edges 51A and 53A. The upper edges 51A and 53A of the inner and outer ridges along with the upper edges 57A of the connecting ribs define the upper edge 35 of the housing 23. Spaced apart recesses 61 are formed in the outer periphery of the outer ridge 53 on all four sides of the housing. Thus there is provided a very rigid and strong upper edge 35 for supporting the lid 21 and which can be readily formed by injection molding since the component parts of the wall structure all have generally similar thicknesses.

A catch 63 is formed on the inside of each of the walls 29A and 29C for receiving hooks formed on the bottom side of the lid 21 for holding the lid in place.

Referring now to FIGS. 2, 3, and 4 the lid 21 is rectangular in shape having a top side 71 and a bottom side 73. The seating surface 27 extends along the four sides of the lid member 25 inward from its peripherial edges 25A–25D. A primary ridge 75 is formed on the bottom side of the lid member 25 and extends along its four sides at a position spaced inward from its peripherial edges. Its purpose is to provide support for the lid member 25 to make it rigid and to prevent it from warping. The primary ridge 75 comprises two straight portions 77 and 79 formed on opposite sides of the lid member and two outwardly curved portions 81 and 83 formed at the other two opposite sides of the lid member. Curved portions 81 may be defined as two end portions 81A and 81B extending from straight portions 77 and 79 and a middle portion 81C spaced from end portions 81A and 81B by gaps 85 and 87. Similarly, curved ridge portion 83 may be defined as two end portions 83A and 83B extending from straight ridge portions 77 and 79 and a middle portion 83C spaced from end portions 83A and 83B by gaps 89 and 91. Each of the straight portions 77 and 79 and each of the outwardly curved portions 81 (81A, 81B, 81C) and 83 (83A, 83B, 83C) have the same vertical dimensions below the seating surface 27 except for hooks formed on ridge portions 81C and 83C as will be described subsequently.

Secondary ridges 93, 95, 97, and 99 are formed on the bottom side of the lid member 25 at its four corners for providing support for the four corners of the lid member and to maintain the curved end ridge portions 81A, 81B, 83A, and 83B rigid. Each of the secondary ridges 93, 95, 97 and 99 has two ends connected to end portions 81A, 81B, 83A, and 83B respectively and curve outwardly therefrom toward the corners. Ribs 101 and 103 extend between the central portions of each of the secondary ridges 93, 95, 97, and 99 and curved end portions 81A, 81B, 83A, and 83B respectively. Each of the secondary ridges 93, 95, 97, and 99 have the same vertical dimensions. It is noted that their vertical dimensions are less than the vertical dimensions of the ridge portions 77, 79, 81 (81A, 81B, 81C) and 83 (83A, 83B, 83C). It is noted further that ridge portions 77, 79, 81C, 83C, and secondary ridges 93, 95, 97, and 99 define the inner boundry of the seating surface 27.

Extending downward from ridge portions 81C and 83C are hooks 107 and 109 which have outwardly extending ends 107A and 109A respectively. When the lid is seated in its closed position, the hook ends 107A and 109A are located below the lower edges 63A of the catches 63 to hold the lid in place. The lid is formed such that the distance between the outward extending ends 107A and 107B of the hooks 107 and 109 is slightly greater than the distance between the inner surfaces 63B of the catches 63. Since there are no connecting ribs or structures secured to ridge portions 81C and 83C their lower ends may be moved inward and outward a slight amount and will spring back to their normal vertical positions when released. Thus they are in effect resilient whereby the hook ends 107A and 109A may be forced inward and slid pass inner surface 63B of catches 63 until they reach the level of their lower edges 63A. At this position the hook ends will spring outward to their normal positions where they will be located under the lower edges 63A of the catches for holding the lid in place. When it is desired to remove the lid, one merely needs to jerk upward on the lid whereby the hook ends 107A and 109A will engage the lower edges 63A of the catches and then be moved inward from under the lower edges 63A of the catches to release the lid.

Referring to other details of the lid, an inner oval shaped ridge 111 extends around the lid member 25 on its lower side spaced inward from the primary ridge 75. The inner ridge 111 is connected to the straight portions 77 and 79 of the primary ridge by way of ribs 113 and to the curved end portions 81A, 81B, 83A, and 83B by way of ribs 115. Cross ridges 117, 119, 121, and 123 form support for the central portion of the lid member 25. An opening 125 for a reading door 127 is formed through the lid member 25 within the rectangle defined by cross ridges 117, 119, 121, and 123. As can be seen, additional support ridges are formed between the inner oval ridge 111 and cross ridges 117, 119, 121, and 123.

The reading door 127 also is formed of the preferred plastic material. It has hinge posts 131 formed on its under side at its end 127A which snap around rod 133 formed as an integral part of the lid. The hinge posts 131 hold the door 127 to the rod 133 and allow the door to pivot around the rod for opening and closing the door. A small aperture 135 is formed through the door 127 at its end 127B to allow one to insert his finger into the aperture to open the door for reading the meter within the housing or for allowing one to obtain a good grip on the lid for removing it from the housing. The underside of the door at its end 127B has a knob 137 integrally formed to provide a friction fit against ridge 123 to hold the door in place.

The lid 21 not only will fit the housing 23 but will fit many other rectangular shaped plastic housings and many of the older type installed rectangular shaped housings made of concrete or cast iron. Many of the rectangular shaped housings formed of plastic, concrete, or cast iron are generally standardized as to the length and width of their upper opening. There is some variation in these dimensions particularly the radius of curvature of their corners. Since the seating surface 27 rests on the top edge of the housing and since it is relatively wide, the lid 21 can fit many other rectangular shaped housings even though there is some variation in their length and width. Since the ridge portions 81A, 81B, 83A, 83B are spaced relatively far from the corners of the lid they do not interfere with the lid fitting housings having different corner sizes. The secondary ridges 93, 95, 97, and 99 provide the required support for the corners of the lid. Since their vertical dimensions are relatively small, they also do not interfere with the lid fitting housings having different corner sizes. The hooks 107 and 109 also effectively hold the lid to the older type previously installed housings made of concrete or cast iron which do not have catches for such hooks. When the lid is fitted to the older type housings, the hook ends 107A and 109A apply outward pressure against the inner walls to hold the lid in place.

In one embodiment the upper opening of the housing at the upper edge 35 has a width of 10 3/16" and a length of 15 8/16". The thickness of the upper edge 35 is about ¾". The lid member 25 has a width of 11 2/16" and a length of 16 6/16". Its thickness is 7/16". The distance between the outer sides of straight ridge portions 77 and 79 is 10 2/16". The distance between the outer sides of curved ridge portions 81C and 83C is 15 4/16". The width of the seating surface 27 is about ½ of an inch. Hook ends 107A and 109A extend outward beyond ridge portions 81C and 83C about 5/16" respectively. The ridge portions defining the primary ridge 75 have a vertical dimension of 1 2/16". The secondary ridges 93, 95, 97, and 99 have a vertical dimension of 8/16". The maximum distance between the outer surfaces of ridge portions 81A, 81B, 83A, and 83B and the respective corners of the lid member 25 is about 1¼". The housing 23 is formed as an integral member by injection molding. The lid member 27 and its supporting ridges is formed as an integral member also by injection molding. The door 127 is formed separately from the lid by injection molding and is fitted within the opening 125 with its post 131 snapped around the rod 133.

What is claimed is:

1. A lid for a housing, said housing having wall means defining a cavity with an upper opening surrounded by an upper edge generally rectangular in shape, said lid comprising:

a generally rectangular shaped lid member formed of plastic material, said lid member having an upper end and a lower end, a seating surface extending along the four sides of said lid member on said lower end and extending inward from the peripheral edges thereof adapted to rest on the upper edge of said housing to support said lid member in a position to close the upper opening of the housing, a primary ridge formed on the lower end of said lid member extending along its four sides at a position spaced inward from the peripheral edges thereof, said primary ridge comprising two straight portions respectively extending along two opposite sides of said lid member and two outwardly curved portions respectively located near the other two opposite sides of said lid member, said two straight portions and said two outwardly curved portions of said primary ridge extending below said seating surface a given distance, a secondary ridge formed at each corner of said lid member on its lower end and extending downward from said seating surface a distance which is less than said given distance, each secondary ridge being a curved member having two ends connected to the outer side of said outwardly curved portions of said primary ridge at each corner of said lid member and having an intermediate portion curving outwardly toward said corner, said secondary ridges being located inward from the peripherial edges of said corners and defining the inner boundry of said seating surface at said corners, said straight portions of said primary ridge defining the inner boundry of said seating surface on said two opposite sides of said lid member, said outwardly curved portions of said primary ridge between said secondary ridges defining the inner boundry of said seating surface on said other two opposite sides of said lid member.

2. The lid of claim 1 wherein;

each of said outwardly curved portions of said primary ridge comprises two end portions and a middle portion, said middle portion being located between said two end portions and spaced therefrom, each of said two end portions extending from said two straight portions respectively and having said two ends of one of said secondary ridges connected thereto, each of said two middle portions having a hook means extending below the lower edge thereof and outward for engaging portions of opposite walls of the housing for holding said lid in its closed position, the distance between said outer ends of said hook means normally being greater than the distance between said opposite walls of the housing at said upper edge, said two middle portions of said primary ridges being relitavely resilient to allow said hook means to be moved inward to allow said lid member to be located in said closed position.

3. A housing for installation in the ground, comprising:

upstanding wall means formed of plastic material defining a cavity having an upper opening and a bottom opening, said upper opening being generally rectangular in shape and formed by surrounding upper wall structure having an upper edge for supporting a lid, said upper wall structure comprising an inner ridge and an outer ridge which surround said upper opening, said inner and outer ridges being joined together at a position located below said upper edge and extend away from each other in an upward direction, the top edges of said inner and outer ridges being spaced apart from each other, and a plurality of ribs extending between said inner and outer ridges at spaced apart positions, the top edges of said inner and outer ridges and of said ribs defining said upper edge of said housing.

4. The housing of claim 3 comprising catch means formed on the inside of opposite walls of said inner ridge near said upper edge for receiving hook means connected to the lid for holding the lid in place.

5. The housing of claim 3 wherein said housing has the shape of a four sided truncated pyramid, said outer ridge having a plurality of spaced apart recesses formed in its outer periphery on all four sides thereof.

6. The housing of claim 3 comprising the combination therewith of a lid, said lid comprising:

a generally rectangular shaped lid member formed of plastic material, said lid member having an upper end and a lower end, a seating surface extending along the four sides of said lid member on said lower end and extending inward from the peripherial edges thereof adapted to rest on the upper edge of said housing to support said lid member in a position to close the upper opening of the housing, a primary ridge formed on the lower end of said lid member extending along its four sides at a position spaced inward from the peripherial edges thereof, said primary ridge comprising two straight portions respectively extending along two opposite sides of said lid member and two outwardly curved portions respectively located near the other two opposite sides of said lid member, said two straight portions and said two outwardly curved portions of said primary ridge extending below said seating surface a given distance, a secondary ridge formed at each corner of said lid member on its lower end and extending downward from said seating surface a distance which is less than said given distance, each secondary ridge being a curved member having two ends connected to the outer side of said outwardly curved portions of said primary ridge at each corner of said lid member and having an intermediate portion curving outwardly toward said corner, said secondary ridges being located inward from the peripherial edges of said corners and defining the inner boundry of said seating surface at said corners, said straight portions said primary ridge defining the inner boundry of said seating surface on said two opposite sides of said lid member, said outwardly curved portions of said primary ridge between said secondary ridges defining the inner boundry of said seating surface on said other two opposite sides of said lid member.

* * * * *